US008189606B2

(12) United States Patent
Leroy et al.

(10) Patent No.: US 8,189,606 B2
(45) Date of Patent: May 29, 2012

(54) NETWORK DEVICE AND METHOD FOR LOCAL ROUTING OF DATA TRAFFIC

(75) Inventors: Suresh Leroy, Vlimmeren (BE); Alistair Urie, Issy-les-Moulineaux (FR)

(73) Assignee: Alcatel Lucent, Paris (FR)

( * ) Notice: Subject to any disclaimer, the term of this patent is extended or adjusted under 35 U.S.C. 154(b) by 512 days.

(21) Appl. No.: 12/385,989

(22) Filed: Apr. 27, 2009

(65) Prior Publication Data

US 2009/0279522 A1 Nov. 12, 2009

(30) Foreign Application Priority Data

May 7, 2008 (EP) .................................... 08290436

(51) Int. Cl.
*H04L 12/56* (2006.01)
(52) U.S. Cl. ........................................ 370/401; 370/338
(58) Field of Classification Search ................. 370/401, 370/402, 230, 349, 389, 301.1, 328, 338, 370/312

See application file for complete search history.

(56) References Cited

U.S. PATENT DOCUMENTS

| 2003/0086418 | A1 | 5/2003 | McIntosh et al. |
| 2004/0208153 | A1 | 10/2004 | Mizell et al. |
| 2006/0111113 | A1 | 5/2006 | Waris |
| 2006/0182083 | A1 | 8/2006 | Nakata et al. |
| 2007/0105568 | A1* | 5/2007 | Nylander et al. .............. 455/458 |
| 2011/0026510 | A1* | 2/2011 | Matsumura et al. .......... 370/338 |

FOREIGN PATENT DOCUMENTS

WO     WO 2004/036332       4/2004

OTHER PUBLICATIONS

European Search Report completed Feb. 5, 2009.

* cited by examiner

*Primary Examiner* — Brenda H Pham
(74) *Attorney, Agent, or Firm* — Harness, Dickey & Pierce (57) ABSTRACT

The present invention is related to a network device for serving a local network being in connection with a mobile network. The network device comprises interfaces for exchanging a data packet and further comprises a packet filter arranged for being connected to a local anchor point replicating the data connection context of an anchor point in the mobile network and arranged for determining, based on at least a destination address contained in the data packet, whether the data packet has a destination within the local network.

10 Claims, 5 Drawing Sheets

NETWORK DEVICE AND METHOD FOR LOCAL ROUTING OF DATA TRAFFIC

FIELD OF THE INVENTION

The present invention generally relates to the field of wireless communications and particularly to local networks having pico or femto radio base stations.

BACKGROUND OF THE INVENTION

In cellular radio systems more wireless user equipment units (UEs) communicate via a radio access network to one or core networks. The user equipment can be a mobile telephone device, a laptop, a PDA or any other wireless device.

A radio access network covers a geographical area which is divided into cell areas. Each cell is served by at least one base station. A cell is defined as a geographical area where radio coverage is provided by the radio base station equipment at a base station site. Each cell is identified by a unique identity, which is broadcast in the cell. The base stations communicate over the air interface with the user equipment units (UE) within range of the base stations.

Recently, so called femto radio base stations have been introduced for use in a residential or small business environment. Such a residential or small business environment may constitute a local network. Femto base stations connect the local network to the service provider's core network via broadband (such as DSL or cable). A femto base station allows service providers to extend service coverage indoors, especially where access would otherwise be limited or unavailable. It incorporates the functionality of a typical base station but extends it to allow a simpler, self contained deployment, for example, a UMTS base station containing a NodeB, RNC and SGSN with Ethernet for backhaul.

A Gateway GPRS Support Node (GGSN) is a network node that acts as a gateway between a General Packetised Radio System (GPRS) wireless data network and other networks such as the Internet or private networks. The GGSN is the anchor point that enables the mobility of the user terminal in GPRS/UMTS networks. It maintains routing necessary to tunnel the protocol data units (PDUs) to the SGSN that service a particular mobile subscriber.

The Radio Network Controller (RNC) is the governing element in the UMTS radio access network responsible for control of the NodeBs, i.e. the base stations which are connected to the controller.

A Serving GPRS Support Node (SGSN) is responsible for the delivery of data packets from and to the mobile stations within its geographical service area. At the core network side an SGSN interfaces with one or more GGSNs. At the radio access network side the SGSN interfaces with an RNC.

A nodeB is a logical network component of a UMTS radio access network responsible for radio transmission/reception in one or more cells to/from the user equipment. A nodeB interfaces with one or more user equipments within its coverage area and with an RNC at the network side.

Although for applying femto based radio stations much attention is focussed on UMTS, it is clear to any skilled person that the approach is readily applicable to all standards, including GSM, CDMA-2000, TD-SCDMA and WiMAX solutions. However, the problem tackled in the present invention is explained with a UMTS network as example.

UMTS femto base stations are small low cost, low power UMTS access points for home and corporate use cases. Mobile operators show a lot of interest in femto base station as a solution for improving indoor coverage as well as offloading traffic from the outdoor UMTS radio network. For the end-user, femto base stations offer the possibility to make cheap voice calls and data or multimedia sessions at home while using their regular cellular phone. Likewise for the mobile operator, femto base stations offer the possibility of offering high bandwidth end user services while offloading their main network.

Within the femto base station solution space, different implementations of a femto base station exist. The main difference between the different femto base station approaches lies in the mobile network functionality hosted on the residential base station and the corresponding degree to which the main network can be off-loaded.

A common characteristic of femto base stations is the fact that data exchanged between the mobile devices or sent towards fixed devices within the local network always passes through the mobile core network.

One way to achieve this is by tunneling all packet based end user data services over a GTP (GPRS Tunneling Protocol) tunnel from the femto base station at the residential side via a femto gateway (i.e. a network device residing in between the femto base stations and the mobile operators network and providing aggregation and security gateway functionality) to a SGSN or in some cases directly the GGSN in the mobile operator's core network. From both a technical and a business point of view this is a good approach for traffic sent to the Internet or to other end-users outside the own home or corporate environment. Furthermore it offers the potential of handovers between a femto base station and a macro cell, since the mobility anchor point resides in the mobile network (in the GGSN).

However for data being exchanged between a mobile device and a PC/laptop/set top box located within the same local network as the femto base station or between a mobile device and another mobile device connected to the femto base station this solution is both expensive and inefficient since all traffic must pass through the operator's core network prior to being routed back to the home. With mobile terminals getting more and more powerful and supporting a variety of multimedia applications the need for exchange and synchronization of data between home devices and mobile terminal increases and so a better solution is required in time.

Anchoring user traffic at two different places (local traffic in the home network and external traffic within the operator's core network) using a single IP address in the user equipment (UE) is currently not possible.

The GPRS specification allows a user to establish multiple 'PDP context' sessions with a single or multiple GGSNs. In this case each GGSN assigns a different IP address to the terminal out of its local address pool. The GGSN selection mechanism is based on APN (Access Point Names) specified by the UE during Packet Data Protocol (PDP) setup. With such a solution it is possible to locate one of the GGSN in the local network to handle local traffic. This solution however has multiple drawbacks:

1. A terminal needs to cope with multiple IP addresses, e.g. multi-homing problem of selecting the right IP address per application or peer node.
2. It is not transparent to the applications which IP address is to be used for which session. For IPv4, multiple IP addresses per terminal quickly leads to a shortage of public IPv4 addresses. This in its turn obliges the operator to assign private addresses, leading to well known issues with NAT (Network Address 'and port' Translation), like the introduction of Application Level Gateways.

3. The solution involves APN management. The end-user needs to explicitly request a PDP context towards a local GGSN, which is not transparent.
4. When a user handovers from his femto base station to an outdoor macro cell the local anchor point needs to be released. As such, handovers from femto base station to outdoor base station break the local sessions.

Consequently, there is a need for an approach wherein these drawbacks of the prior art are overcome.

AIMS OF THE INVENTION

The present invention aims to provide a network device and a network structure which allow anchoring user traffic at two different places using a single IP address. The invention further aims to provide a method for offloading data traffic from a mobile core network.

SUMMARY OF THE INVENTION

The present invention provides a networking device for serving a local network being in connection with a mobile network. The network device comprises interfaces for exchanging a data packet. The device further comprises a packet filter arranged for being connected to a local anchor point that replicates the data connection context of an anchor point in the mobile network. The packet filter is also arranged for determining, based on a destination address contained in the data packet, whether the data packet has a destination within the local network.

In an advantageous embodiment the local anchor point is comprised in the network device.

Preferably the device is further arranged for storing rules for forwarding data packets.

The networking device of the present invention is typically a femto base station or a home gateway.

In case the networking device is a femto base station, the said packet filter is preferably operable according to the GTP protocol or to the MIP protocol.

The invention also relates to a local network comprising at least one network device as previously described and a local anchor point for replicating the data connection context of an anchor point in a mobile network. As already mentioned, said local anchor point may advantageously be integrated into the networking device.

In another aspect the invention relates to a method for offloading data traffic from a mobile network, whereby the mobile network is in connection with a local network. The method comprises the steps of:
  determining with a packet filter in a network device in said local network whether a data packet to be exchanged has a destination within said local network based on a destination address in said data packet to be exchanged, whereby said packet filter in said network device is connected to a local anchor point replicating the data connection context of an anchor point in a mobile network,
  if so, forwarding the data packet to the destination address within the local network,
  otherwise, forwarding the data packet to the mobile network.

In a preferred embodiment the method further comprises the step of configuring the packet filter with rules for forwarding data packets.

In an advantageous embodiment the mobile network is in connection with the local network via a broadband access network.

The step of determining may advantageously be based on the destination address in combination n with further data contained in the data packet.

DETAILED DESCRIPTION OF EMBODIMENTS)

The present invention provides a transparent solution, to the user equipment and mobile core network, enabling efficient data exchange between mobile terminals and IP hosts in general connected to the same local data network, while at the same time non-local traffic still gets routed in the traditional way through the mobile core network. Transparency hereby means using a single IP address for both local and external IP communication and the ability to maintain IP session continuity when performing a handover to or from an outdoor base station.

Some examples of local data transfer are:
  Uploading the latest pictures from the mobile to the desktop PC or TV setup box.
  Downloading the latest mp3 playing list to the mobile
  Synchronizing mail, contact addresses and calendar data
  Downloading an audio book on the mobile
  Downloading the latest ringing tones, backgrounds, GIFs, etc.
  IMS based multi-media and voice services between members of the same family or small business Although an important application field is targeted at residential femto base stations, the same mechanism as described here can also be applied in corporate environments and, as already mentioned, to other cellular solutions such as WiMAX, CDMA-2000, TD-SCDMA or LTE (Long Term Evolution, a $4^{th}$ generation mobile telephone standard).

To resolve the issues with multiple IP addresses and GGSN selection a second mirror/phantom GGSN is introduced in the local network. When connected to the femto base station, all new and existing packet data protocol (PDP) contexts are automatically duplicated towards a local GGSN. The local PDP contexts are associated with the same IP addresses and attributes as their external counterparts. Doing so effectively creates two data anchor points, a local and an external anchor point, both capable of filtering and forwarding incoming packets to the correct PDP context.

Apart from the local GGSN mirror also a GTP packet filter or traffic flow template is necessary to determine the GGSN instance to which to send upstream packets. The role of the GTP packet filter is to determine based on the destination IP address, possibly in combination with other parameters of the inner GTP packet, the target GGSN. If the destination address corresponds to an IP address within the local network or to a mobile terminal connected to the same femto base station (or to another femto base station in the same local network) the GTP tunnel is redirected to the local anchor point that replicates the data context of the GGSN in the core network, all other packets are sent to the GGSN in the mobile operators network.

For packets sent from a local PC or IP host to a mobile terminal connected to a femto base station in the local network, a similar filter is needed at the home gateway. Packets having as destination address the address of the user equipment unit (UE) have to be redirected by the home gateway to the serving femto base station. Setting the right forwarding rules can be achieved by either a dedicated signalling message between the home gateway and the femto base station or through the use of ICMP (Internet Control Message Protocol) redirect and gratuitous ARPs (Address Resolution Protocol) by the femto base station. The ICMP redirect ensures the layer 3 routing tables are adjusted while the gratuitous ARP message allows linking the IP address of the mobile terminal to the MAC address of the femto base station.

As both uplink and downlink filtering is performed by network elements within the local network (femto base station and home gateway) the whole procedure remains transparent to both the mobile terminal and the mobile core network.

A handover from femto base station to outdoor coverage can be performed as follows. As the packet filtering is done within the local network, handing over the GPRS sessions from indoor femto to outdoor cellular network results in all packets being forwarded to the mobile operator's GGSN. When the femto base station detects the mobile terminal has handed over the session, it needs to instruct the home gateway to reset the layer 3 and 2 forwarding rules for that specific terminal. Resetting layer 3 and 2 forwarding rules results in packet destined for the user equipment to be forwarded by the home gateway to the mobile anchor point in the core network. On its turn the mobile anchor point delivers the packets to the mobile device currently connected to a macro cell. This ensures service continuity after the handover has taken place.

A handover from outdoor base to the femto base station can take place as follows. An outdoor base station to femto base station handover corresponds to inter SGSN type of handover known in current GPRS networks. During an inter-SGSN handover all PDP contexts information is pushed from the old SGSN to the target SGSN of the femto base station. Within the PDP context information all the necessary information is duplicated and pushed to the local GGSN. After the femto base station has detected the user equipment has successfully handed over the session, it configures the appropriate forwarding rules in the packet filters of the femto base station and home gateway according to the methods previously explained.

Figure 1:
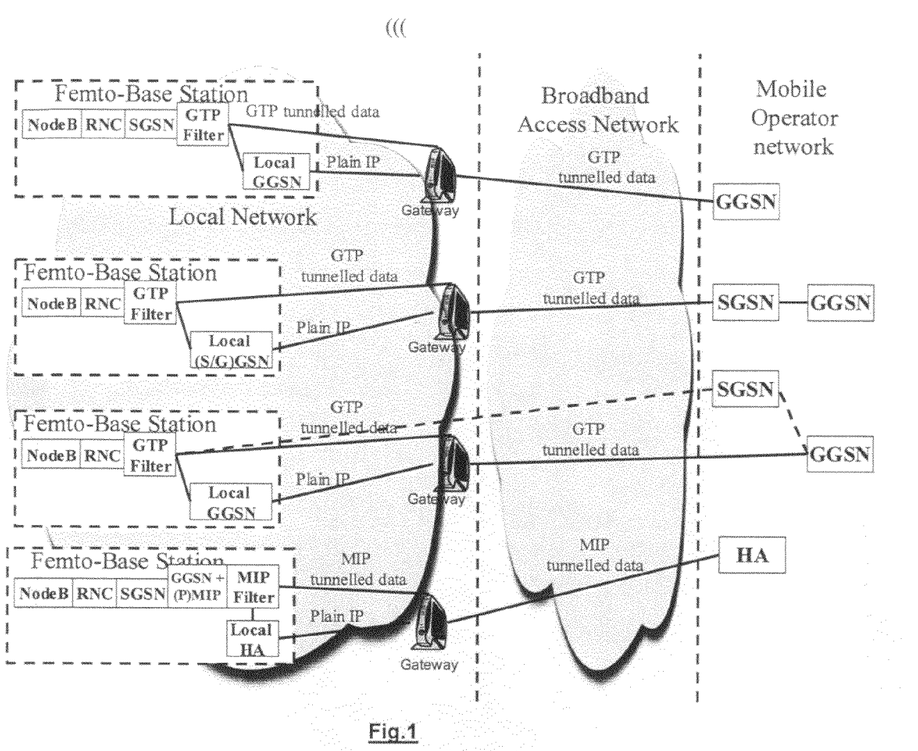
FIG. 1 represents various embodiments of the present invention.

The solution described above is based on 3GPP TS 23.060 and a femto base station combining NodeB, RNC and SGSN functionality and interfacing with a GGSN within the operator's network. The same principle can also apply to other femto base station implementation variants as explained below. FIG. 1 illustrates these variants.

In one embodiment the femto base station combines NodeB and RNC functionality and interfaces with an SGSN within the operator's network. At the user plane the interface between an RNC and an SGSN is GTP-U based and identical to the interface between SGSN and GGSN.

Alternatively the femto base station may combine all GPRS functionality (NodeB, RNC, SGSN, GGSN) and interface through a Mobile IP (MIP) interface with a MIP Home Agent (HA) in the operator's network. Although the protocol is different (MIP vs. GTP) the same filtering criteria and rules can apply as in the GTP embodiment.

As a further option, the femto base station may combine nodeB and RNC functionality with the associated mobile network supporting the "direct tunnel" feature. Direct tunneling is an option specified in 3GPP which restricts the SGSN functionality to a pure control entity. The data plane is tunneled directly from the RNC to the GGSN. This solution combines the benefits at the control plane of solution with a network based SGSN (e.g. more secure plus limits Home Location Register (HLR) signalling) with an optimal data path as available in centralized GGSN solution.

The same principles are also applicable to WiMAX or LTE based architectures and their successors where the anchor points are called a Home Agent (HA) and a Packet Data Network Gateway (PDN-GW), respectively.

Figure 2:
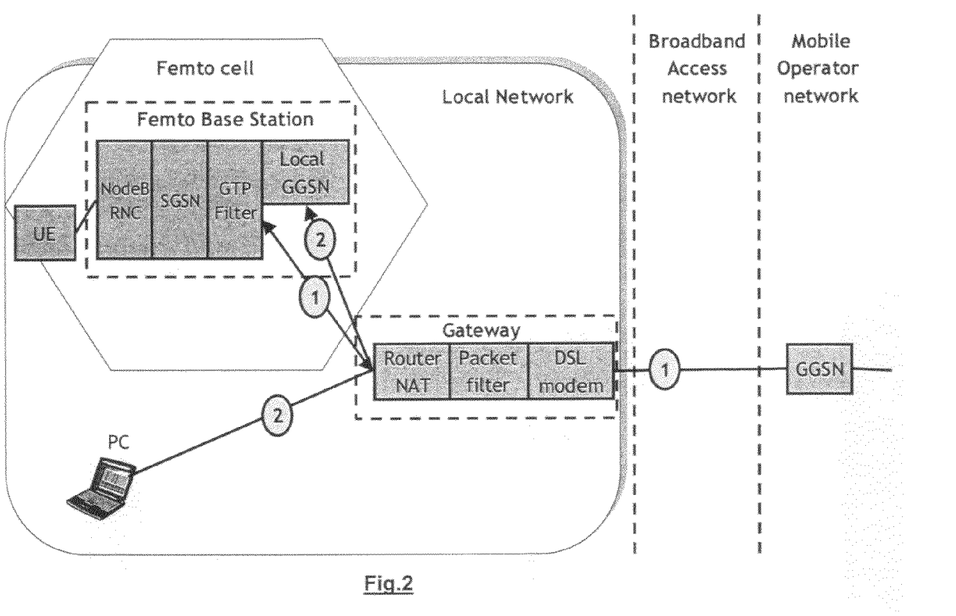
FIG. 2 illustrates a functional diagram of an end-to-end solution comprising a femto base station and a home gateway.

FIG. 2 represents a functional diagram of a femto base station interconnected via a DSL based broadband access network to an anchor point in the mobile core network. The anchor point in the mobile core network is a GGSN. The femto base station is a network device comprising NodeB/RNC, SGSN, GTP filter and local GGSN functionality. The femto base station is interconnected to a local network through a gateway comprising DSL modem and router plus NAT functionality. The gateway further comprises means to interconnect through a DSL line to an external data network. One or more wireless user equipments (UE) are in communication with a femto base station for exchanging data packets.

Links numbered 1 represent the data path between a base station and an anchor point in the mobile core network for the exchange of data between UE and external networks. In this embodiment the UE data packets over links numbered 1 are tunneled over GTP (GPRS Tunneling Protocol).

Links numbered 2 represent the local data path between used for communication between wireless UEs connected to femto base station and IP hosts or PCs connected to the local network. Data packets exchanged over links numbered 2 are not tunneled. Links numbered 1 and 2 represent logical links, not physical links.

For uplink packets from the UE the GTP filter determines based on the destination address of the uplink packet if the data packet needs to be sent to the local GGSN or to a GGSN in the mobile core network. External data is sent to the GGSN in the mobile core following links numbered 1. Data having as destination a local IP host is processed by the local GGSN. The local GGSN terminates the GTP tunneling and forwards the local packets to the gateway which on its turn delivers the packet to the local IP host.

For downlink packets it is the gateway that determines if the packet needs to be sent to an external network (over the DSL link) or to a local femto base station. The gateway performs this forwarding based on the destination IP address of the packet received from a local IP host. If the destination IP address matches that of one of the UEs connected to a local femto base station the gateway forwards the data packet to the corresponding femto base station. The forwarding rules in the packet filter of the home gateway are set dynamically by the femto base station upon detection of an attached UE with an active PDP context.

Figure 3:
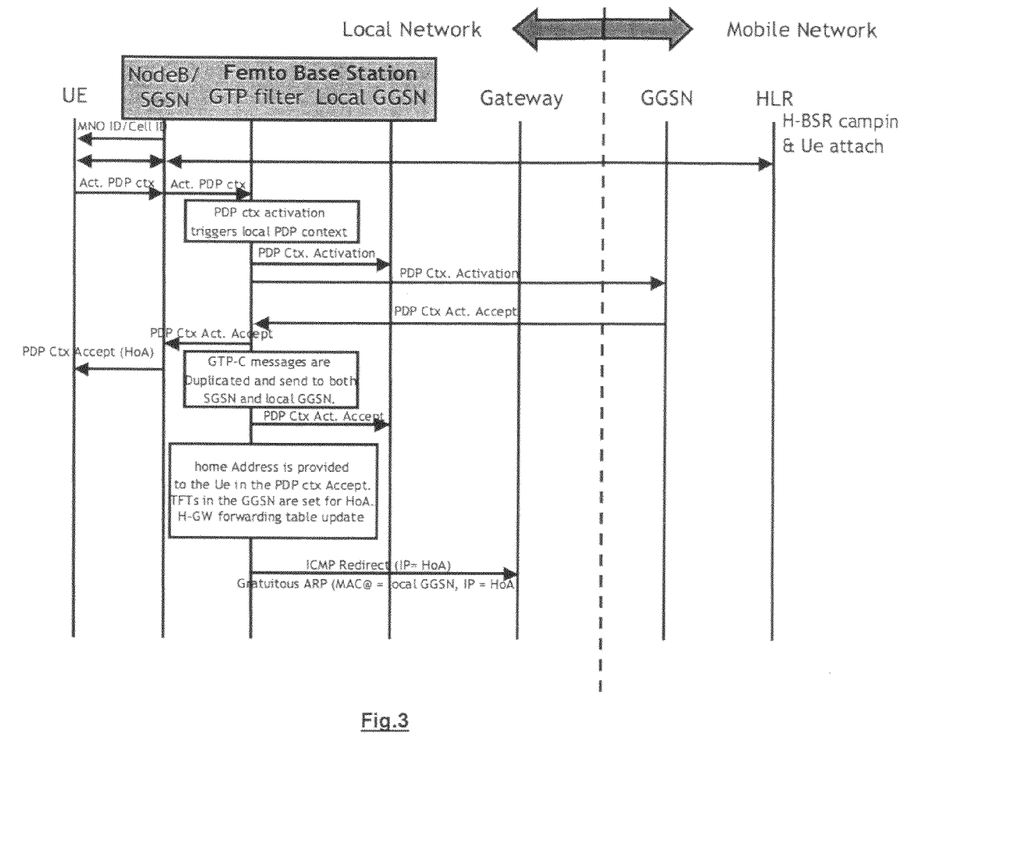
FIG. 3 illustrates an instantiation of a session establishment.

FIG. 3 represents a typical signalling flow for the establishment of a GPRS PDP context according to 3GPP TS 23.060. Additional steps have been added to enable optimized routing for local data. The two first messages represent the necessary signalling for a UE to attach to a femto base station. The necessary information is stored in the HLR (Home Location Register). After being attached to the femto base station the UE can start establishing a PDP context towards an anchor point in the mobile core network. During PDP context activation all the necessary information is exchanged between the femto base station and the mobile core to successfully setup an IP session from the UE to the mobile core. Information exchanged can comprise required QoS, IP address for the UE, selection of the GGSN, etc. A femto base station enabled for support of optimized local data routing creates a local replica of the GGSN based on the information exchanged during the PDP context activation. Together with the local anchor point also the GTP packet filters are enabled based on pre-provisioned configuration information. After successful PDP context activation two anchor points have been created, one in the mobile core for external data and a local anchor point for local data exchange, both capable of receiving incoming UE data packets and forwarding them to the corresponding UE.

The last step consists of updating the gateway with the forwarding rules corresponding to the IP address assigned to the UE. This can be done through a combination of ICMP redirect and gratuitous ARP or through direct signalling between the femto base station and the gateway. The new IP forwarding rules ensure packets with as destination address the UE are relayed to the femto base station serving the UE.

Figure 4:
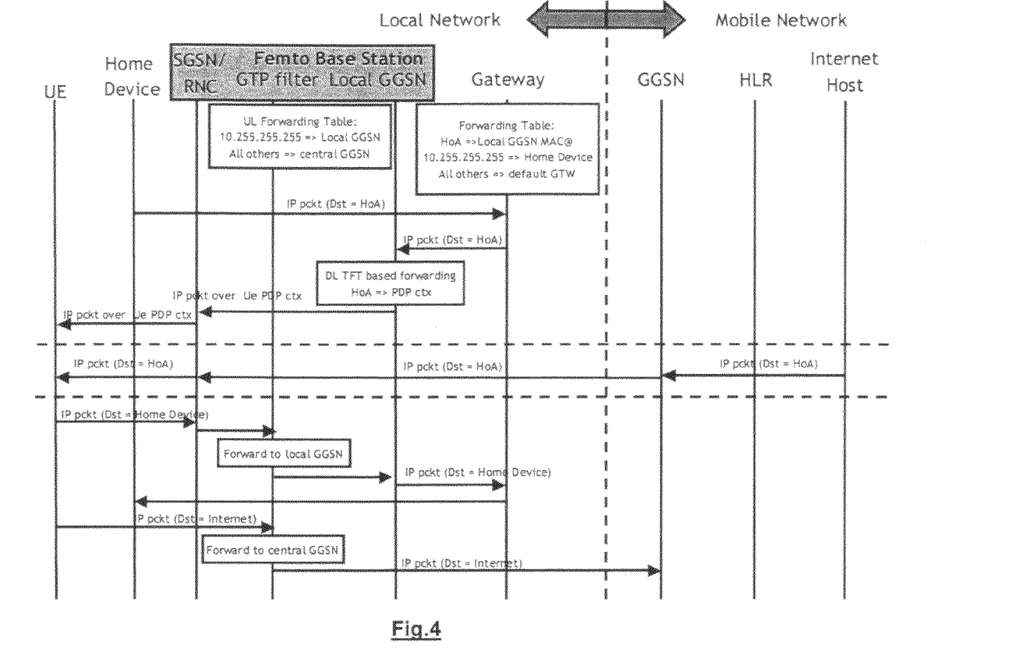
FIG. 4 illustrates the forwarding of a downlink packet.

After successful PDP context activation (as illustrated in FIG. 3) all the right functions are in place to properly route data packets. FIG. 4 illustrates the difference in processing of external and local data packets sent by a local IP host to a UE connected to a local femto base station. The packet filtering criteria are illustrated in the two top squares. The top half of the figure represents downlink packet processing sent by a local IP host to a UE connected a local femto base station.

Packets sent by a local IP hosts are intercepted by a gateway and their destination IP address is compared with the entries in the gateway forwarding table. For UEs connected to a local femto base station an entry in the forwarding table is present pointing to the MAC address of the femto base station. Within the figure the UE IP address is referenced by HoA (Home Address). The gateway routes the packets with as destination the UE IP address to the local femto base station. Within the femto base station the local GGSN replica processes the incoming packet and puts it on the right PDP context.

The bottom half of the figure (below the dashed line) represents packet processing for packets sent by a UE over a femto based station to either a local IP host or to an IP host connected to an external network.

The UL forwarding table is used by the GTP packet filter in the femto base station to determine if packets need to be sent to the local GGSN or to a remote GGSN. The IP destination address of the inner packet in the GTP tunnel is matched to the IP subnet mask (10.255.255.255). If the destination falls within the same subnet the GTP tunnel are forwarded to the local GGSN instance. The local GGSN terminates the GTP tunnel and forwards the plain IP packet to the gateway of the local network. The gateway forwards the packet directly to the local IP host. Upon a negative match of the destination IP address with the subnet for local hosts all GTP tunneled packets are forwarded to a GGSN residing in the mobile core network.

Figure 5:
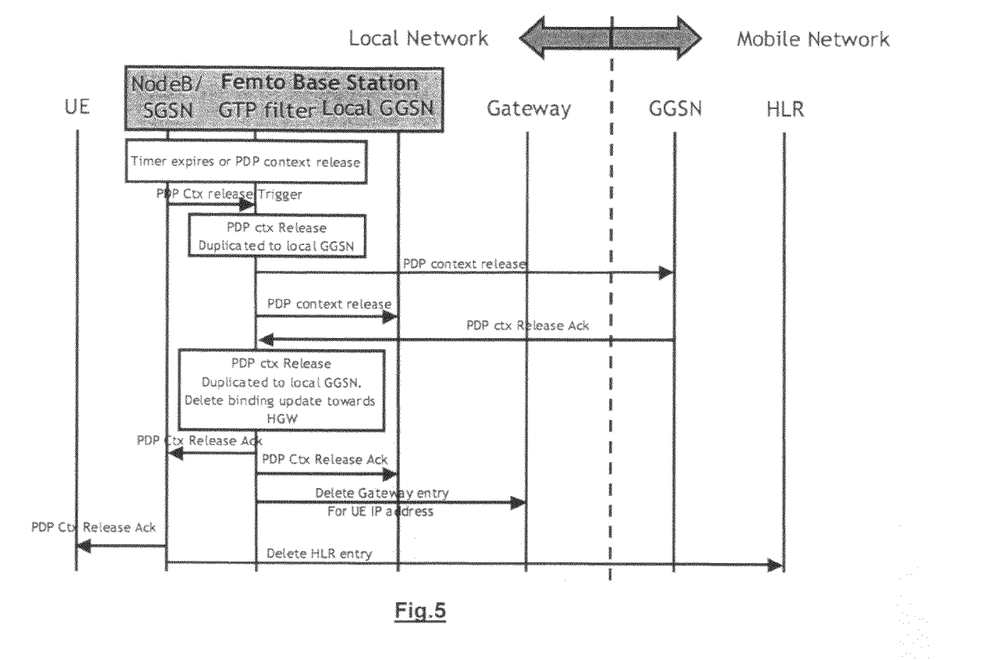
FIG. 5 illustrates the forwarding of an uplink packet.

If no longer required, a PDP context can be released. FIG. 5 illustrates such a PDP context release. A release of a PDP context results, in addition to the normal PDP context release procedures, in a removal of the packet filtering rules at the gateway and a release of the related PDP context information in the local GGSN. Similar actions are also required when a UE hands over to a macro cell. The GTP packet filter duplicates all GTP-C messages towards the local GGSN. After receiving a PDP ctx release acknowledgement from the GGSN in the mobile network the femto base station releases the packet forwarding rules for the address of the UE in the gateway. After the forwarding rule for the UE address is reset, the gateway stops forwarding the packets to the local anchor point and rather sends them over the broadband access network.

The present invention thus describes a transparent mechanism with respect to the end-user and device, which combines the traditional data anchoring at the mobile operators networks for external data with optimized local traffic between devices within the home environment. The invention solves the local traffic exchange between UMTS mobile terminals and home devices in a way transparent to both the mobile terminal and the mobile core network.

Although the present invention has been illustrated by reference to specific embodiments, it will be apparent to those skilled in the art that the invention is not limited to the details of the foregoing illustrative embodiments, and that the present invention may be embodied with various changes and modifications without departing from the spirit and scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the spirit and scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfill the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A network device for serving a local network being in connection with a mobile network, said network device comprising:
   interfaces for exchanging a data packet;
   a local anchor point; and
      a packet filter arranged for being connected to the local anchor point replicating the data connection context of an anchor point in said mobile network and arranged for determining, based on a destination address contained in said data packet, whether the data packet has a destination within said local network.

2. The network device as in claim 1, wherein said packet filter is arranged for storing rules for forwarding data packets.

3. The network device as in claim 1, whereby said device is a femto base station.

4. The network device as in claim 3, wherein said packet filter is operable according to the GTP protocol or to the MIP protocol.

5. The network device as in claim 1, whereby said device is a gateway.

6. A local network comprising at least one network device as in claim 1 and a local anchor point for replicating the data connection context of an anchor point in a mobile network.

7. A method for offloading data traffic from a mobile network, said mobile network being in connection with a local network, said method comprising:

determining with a packet filter in a network device in said local network whether a data packet to be exchanged has a destination within said local network based on a destination address in said data packet to be exchanged, wherein said packet filter in said network device is connected to a local anchor point replicating the data connection context of an anchor point in a mobile network;

forwarding said data packet to said destination address within said local network, in response to determining that the data packet to be exchanged has the destination within said local network; and forwarding said data packet to said mobile core network, in response to determining that the data packet to be exchanged does not have the destination within said local network.

8. The method as in claim 7, further comprising the step of configuring said packet filter with rules for forwarding data packets.

9. The method as in claim 7, wherein said mobile network is in connection with said local network via a broadband access network.

10. The method as in claim 7, wherein said determining is based on said destination address in combination with further data contained in said data packet.

* * * * *